US008238658B2

(12) United States Patent
Blain et al.

(10) Patent No.: US 8,238,658 B2
(45) Date of Patent: Aug. 7, 2012

(54) BOUNDARY EXTRACTION METHOD

(75) Inventors: Cheryl A. Blain, Slidell, LA (US);
Carolus M. Cobb, Slidell, LA (US);
Alan Weidemann, Carriere, MS (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 384 days.

(21) Appl. No.: 12/688,011

(22) Filed: Jan. 15, 2010

(65) Prior Publication Data
US 2011/0013841 A1 Jan. 20, 2011

Related U.S. Application Data

(60) Provisional application No. 61/146,122, filed on Jan. 21, 2009.

(51) Int. Cl.
G06K 9/34 (2006.01)
G06K 9/48 (2006.01)

(52) U.S. Cl. ........................................ 382/173; 382/199

(58) Field of Classification Search .................. 382/173, 382/174, 175, 190, 191, 192, 193, 194, 195, 382/197, 199, 201, 203, 204, 205, 206; 348/162, 348/163, 164
See application file for complete search history.

(56) References Cited

U.S. PATENT DOCUMENTS
2006/0290695 A1* 12/2006 Salomie ........................ 345/420

OTHER PUBLICATIONS

U.S. Appl. No. 61/146,122, Inventor: Cheryl Ann Blain et al, filed Jan. 21, 2009.

Liu, H.; Jezek, K.C., 2004. Automated extraction of coastline from satellite imagery by integrating Canny edge detection and locally adaptive thresholding methods. Int. J. Remote Sensing vol. 25, No. 5, pp. 937-958.

Blain. C.A., Aug. 4, 2010. A Simple Methodology for Deriving Continuous Shorelines from Imagery: Application to Rivers Submission to: Environmental Modeling and Software.

J.S. Lee, et al., "Coastline detection and tracing in SAR images." IEEE Transactions on Geoscience and Remote Sensing, 28(4), 662-668 (1990).

Y. Yu, "Automated delineation of coastline from polarimetric SAR imagery," International Journal of Remote Sensing, 25 (17), 3423 3438 (2004).

G. Gorman, et al., "Shoreline approximation for unstructured mesh generation," Computers and Geosciences, 33, 666-667 (2007).

I. Kolingerova, et al., "Reconstructing boundaries within a given set of points, using Delaunay triangulation," Computers and Geosciences, 32, 1310 1319 (2006).

D.C. Mason, et al., "Accurate and efficient determination of the shoreline in ERS-1 SAR images," IEEE Transactions on Geoscience and Remote Sensing, 34(5), 1243-1253 (1996).

* cited by examiner

*Primary Examiner* — Brian Le
(74) *Attorney, Agent, or Firm* — Amy L. Ressing; Joslyn Barritt; Kathleen Chapman

(57) ABSTRACT

A computer-implemented method for creating an ordered set of shoreline boundary points by transforming data from remotely sensed imagery of shorelines is provided. A water data set and an edge data set are transformed into a set of 3-point boundary segments having a specific head and tail point and the segments are ordered from tail to head in a clockwise or counterclockwise manner relative to the water. Once the 3-point segments are created they are easily linked together into larger segments. These large multi-point segments in turn are linked together to create the shorelines for rivers or coastal areas.

8 Claims, 10 Drawing Sheets

BOUNDARY EXTRACTION METHOD

CROSS-REFERENCE

This application claims the benefit of priority based on U.S. Provisional Patent Application No. 61/146,122 filed on Jan. 21, 2009, the entirety of which is hereby incorporated by reference into the present application.

TECHNICAL FIELD

The present invention relates to computer-implemented automated mapping and modeling of boundaries such as shorelines of rivers, estuaries, and other coastal areas.

BACKGROUND

Shoreline position is essential information for autonomous vehicle navigation, river management such as monitoring channel flow changes, pollution tracking, and characterization of riverine currents and erosion processes. Waterway surveys taken solely from the land can be prohibitive due to challenging terrain or outright inaccessibility of a region. Often such surveys desire such high levels of spatial resolution that they become economically infeasible. Modern advances in the availability, quality, resolution, and processing methodologies for high resolution imagery render it an attractive, alternative source for shoreline information. While edges in imagery data are easily detected by the human eye, significant efforts in recent times have been devoted to the automated extraction of these edges, though each of these approaches has drawbacks and shortfalls.

The problem of extracting accurate shoreline information from remotely sensed images such as imagery from Synthetic Aperture Radar (SAR) or digital imagery obtained from satellites or aircraft is an on-going concern facing the remote sensing and geographical modeling communities. This is a very important problem since knowledge of a shoreline position over large areas is essential for autonomous ship navigation, coastal management, and coastal modeling of currents and erosion. In addition, it is often difficult to survey a region solely from the land since terrain and/or accessibility can often prohibit data collection in some coastal areas, necessitating the use of remote sensing methods. However, manually determining shorelines from aerial photographs is a time-consuming process that is prone to errors due to the inherent subjectivity of an individual cartographer. Thus, automated software-based methods are currently a topic of significant interest.

The standard approaches for solving the shoreline extraction problem have involved first locating the land-water boundary through edge detection and then delineating the location of the boundary through line segment tracing. The practical use of edge data, for numerical modeling or geographical information systems (GIS) purposes, requires the edge coordinates be ordered in either a clockwise or counter-clockwise manner and be self-consistent.

There are a number of well-known algorithms for edge detection and boundary tracing. For example, to determine the "edge" region between land and water, the variation (or gradient) in pixel intensity is typically used. However, because pixilated images have a discrete resolution and the contrast between the land and the water can be poor, sophisticated methods have been developed for isolating the edge pixels. See J. S. Lee, et al., "Coastline detection and tracing in SAR images." *IEEE Transactions on Geoscience and Remote Sensing*, 28(4), 662-668 (1990); and Y. Yu, "Automated delineation of coastline from polarimetric SAR imagery," *International Journal of Remote Sensing*, 25 (17), 3423-3438 (2004). This becomes a particularly difficult process in either extremely shallow water with sandy bottoms or when there are shadows on the water caused by vegetation around the water edge. In these cases small differences between radiance values of the land and water can exist at many wavelengths commonly used in edge discrimination.

The boundary tracing procedure is also quite complex and requires a number of steps to determine the line segments that accurately represent the shoreline. Because the boundary tracing process can lead to disconnected line segments if the boundary is not well defined due to poor edge resolution, a number of methods for connecting boundary segments have been developed as well. See G. Gorman, et al., "Shoreline approximation for unstructured mesh generation," *Computers and Geosciences*, 33, 666-667 (2007); and I. Kolingerova, et al., "Reconstructing boundaries within a given set of points, using Delaunay triangulation," *Computers and Geosciences*, 32, 1310-1319 (2006).

In addition, small regions of isolated "land" or "water" points can also be eliminated from the shoreline boundary based on some reasonable criteria to distinguish significant land or water masses from noise in the images. An essential part of tracing the boundary involves determining how to connect neighboring edge pixels to each other in such a manner that a smooth boundary is produced. The most widely used method to accomplish this involves an eight point "stencil" centered at each edge pixel. The eight nearest neighbors of a pixel box (four face sharing boxes and four corner touching boxes along the diagonals of the central pixel box) are searched in order to determine the nearest neighboring "edge" pixel that minimizes the angular change from the existing boundary line segment. Using this approach an initial list of line segment vectors can be created. After this initial step, the boundary can be further refined by joining larger multi-vector segments.

A drawback of this approach is that it must be assumed that the coastline does not change rapidly in the tracing direction (i.e. the minimum angle constraint) and a searching procedure must be implemented to determine the nearest pixel (of the eight neighbors) that satisfies the minimum angle criteria. Also, this approach does not enforce any particular tracing direction (clockwise or counter-clockwise) around the land-water boundary. As a result, there is an additional post-processing step required to create a vectorized shoreline data set, which requires additional time and processing resources.

Other approaches for extracting shorelines can involve more complex transformations of the remotely sensed imagery (i.e. Watershed transform, Hough transform, active contouring or "snakes", classification schemes). See D. C. Mason, et al., "Accurate and efficient determination of the shoreline in ERS-1 SAR images," *IEEE Transactions on Geoscience and Remote Sensing*, 34(5), 1243-1253 (1996). The primary drawback of these methods is that they involve a number of mathematical procedures that all have various caveats with regard to how they may be applied. In addition, although these approaches are mathematically rigorous they may not be robust in their applicability to all intended problems and thus may require additional refinements and checking procedures to ensure the quality of the extracted shoreline.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a robust, adaptable computer-implemented method for creating an ordered set of boundary points by transforming data from remotely sensed imagery of boundaries such as shorelines associated with rivers, estuaries, and other coastal areas. The set of boundary points derived in accordance with the present invention can be incorporated into applications such as mesh generation programs or other Geographical Information System (GIS) software or applications.

In accordance with the present invention, two data sets associated with a digital image are received by the computer. A first data set ("water data") comprises pixel locations in a digital image indicating the presence of water. A second data set ("edge data") comprises pixel locations in the digital image that delineate a land-water interface. The boundary is defined as having either a clockwise or a counterclockwise direction. A set of 3-point boundary segments is created from each edge point and its nearest neighbors and an orientation of each segment with respect to the water is determined The edge points are given a specific head and tail point based on the direction of the water and the predetermined clockwise or counterclockwise direction so that the edge points form an ordered, properly oriented set of boundary points. Once the ordered set of boundary points is created, a set of ordered boundary segments can created from each edge point and its nearest neighbors, which can then be linked together into larger segments. These large multi-point segments in turn are linked together to create the shorelines for rivers or coastal areas. Because larger segments are also ordered it is straightforward to determine which neighboring segments are to be linked since head to tail point ordering must be maintained. Small closed regions containing water data are then easily eliminated since they correspond primarily to noise from the image processing.

DETAILED DESCRIPTION

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present invention provides a computer-implemented method for creating an ordered set of boundary points by transforming data from remotely sensed imagery of boundaries such as shorelines associated with rivers, estuaries, and other coastal areas. As will be appreciated by one skilled in the art, creation of an ordered set of shoreline boundary points in accordance with the present invention can be accomplished by executing one or more sequences of instructions contained in computer-readable program code read into a memory of one or more general or special-purpose computers configured to execute the instructions, wherein, for example, water data, edge data, and orientation data are transformed into an ordered set of boundary points which can be joined to form an ordered set of boundary segments having a specific head and tail point or wherein the data of individual boundary segments is transformed into data of a shoreline such as a shoreline of a river or larger coastal area.

The invention also includes a computer program product comprising a computer-usable medium having computer-readable program code embodied thereon, the computer-readable program code adapted to be executed to implement a method for transforming water and edge data to generate an ordered set of shoreline boundary points in accordance with one or more aspects described herein.

Figure 1:
FIG. 1 depicts a hyperspectral image of a section of the Pearl River in Mississippi used in connection with an exemplary application of a boundary extraction method in accordance with the present invention.

As noted above, the remote sensing and geographical modeling community is often concerned with analyzing, modeling, and simulating remote imagery that includes shorelines such as those present in rivers or other coastal areas. For example, FIG. 1 depicts a hyperspectral image of a section of the Pearl River in Mississippi. The present invention provides a robust, efficient way to extract the shoreline data and generate an ordered set of shoreline boundary points that can be incorporated into applications such as mesh generation programs or other Geographical Information System (GIS) software or applications.

Figure 2:
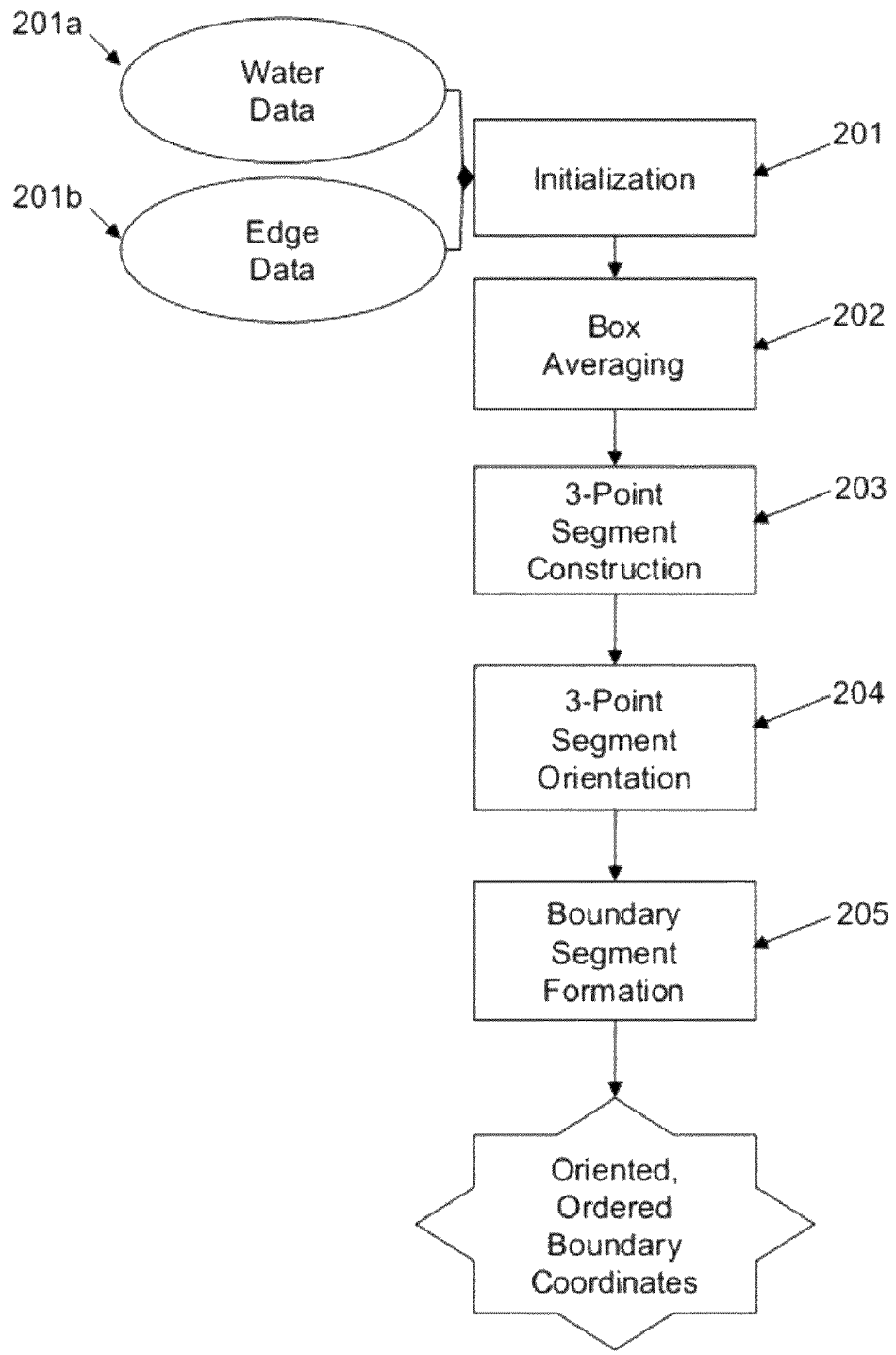
FIG. 2 depicts an exemplary process flow used in a boundary extraction method in accordance with the present invention.

FIG. 2 depicts an exemplary process flow that can be used by a computer to transform digital image data into a set of ordered shoreline boundary points in accordance with the present invention.

At step 201 in accordance with the present invention, the process is initialized. As part of the initialization step, two sets of digital image data 201a, 201b are received by the computer. This data can be obtained from any suitable source of digital imagery such as hyperspectral imagery from aircraft flyover, radar imagery, or satellite imagery from available satellites such as QUICKBIRD, IKONOS, or LANDSAT. In an exemplary embodiment described herein and illustrated in the Figures, the data is derived from the hyperspectral image of the Pearl River shown in FIG. 1.

Figure 3A:
FIGS. 3A and 3B depict images showing the location of water (FIG. 3A) and land-water interfaces (FIG. 3B) generated from water data and edge data sets derived from remotely sensed data of the Pearl River in Mississippi.
Figure 3B:
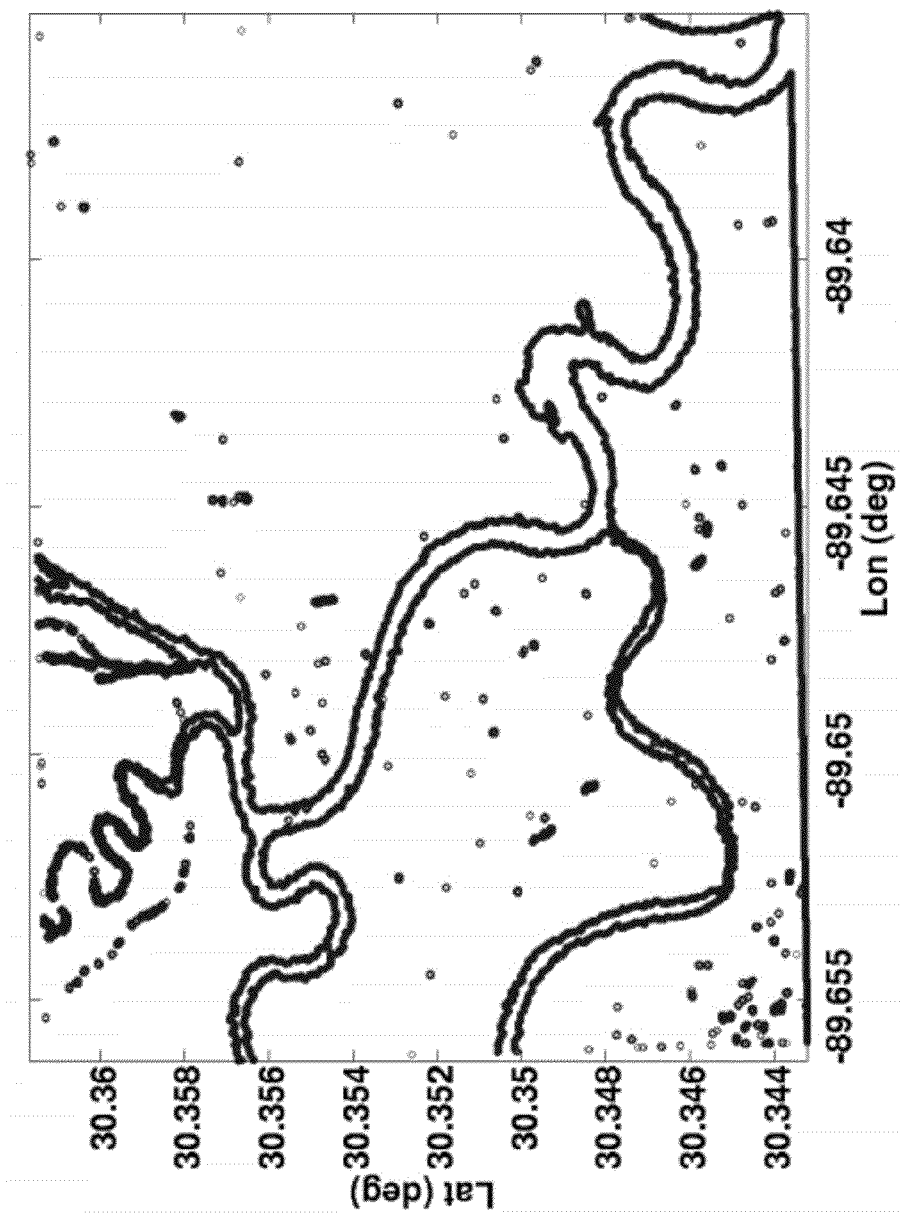

The first data set 201a consists of pixel locations in the digital image indicating the presence of water ("water data"). The second data set 201b consists of pixel locations in the image that delineate the land-water interface ("edge data") where the land-water interface can be determined in any suitable way, such as by using standard edge detection algorithms that are part of the widely used image analysis software, ENVI. FIGS. 3A and 3B depict images generated from water data and edge data derived from the digital image of the Pearl River shown in FIG. 1. However, although the pixel coordinates of the edge data (land-water interface) can be determined from the imagery, they are not in any particular ordered sequence with respect to one another, and so, as seen in FIGS. 3A and 3B, images produced directly from these data can be noisy and cluttered, and lacking in well-defined boundaries.

Practical use of the edge data (e.g. numerical modeling or geographical information systems (GIS)) requires that the shoreline coordinates be ordered so that they can be sequentially linked to form a smooth continuous boundary. One logical way in which the coordinates can be ordered is in either a clockwise or counterclockwise manner. Consequently, as another part of initialization step 101, a clockwise or counterclockwise direction of the shoreline can be selected. The direction of the boundary can be selected automatically, for example, as a software setting applicable to all boundary processing or can be manually selected by the user. Whether automatically or manually selected, the clockwise or counterclockwise boundary direction is an arbitrary choice and the direction does not matter so long as it is maintained throughout the process.

Figure 4:
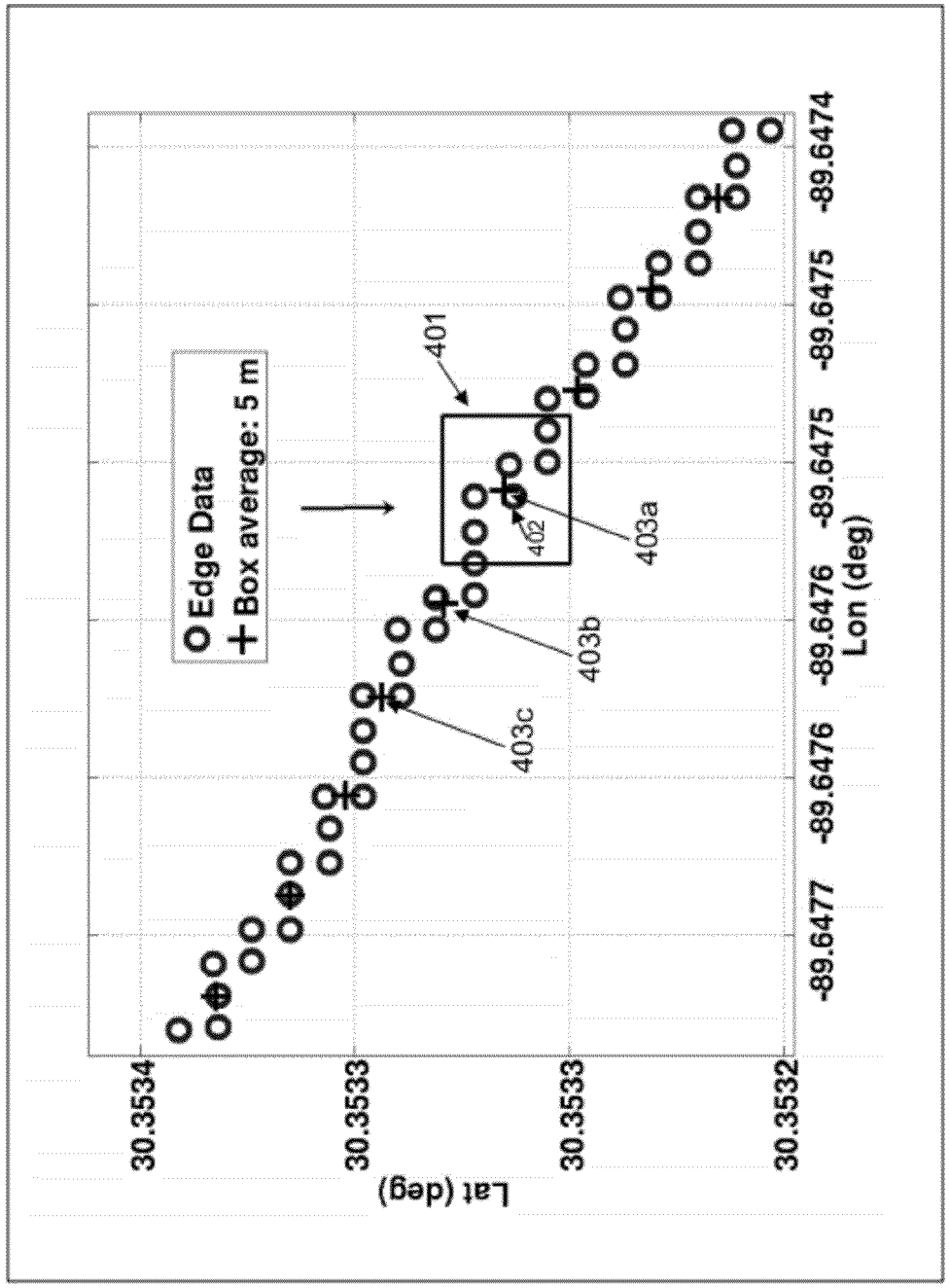
FIG. 4 depicts an exemplary application of a box averaging procedure used in a boundary extraction method in accordance with the present invention.

In step 201, and as illustrated in FIG. 4, a moving, two-dimensional box average can be applied to points in the edge data set in order to minimize the "width" of the edge data. Depending upon the level of processing applied to obtain the edge data and/or the accuracy desired for the shoreline coordinates, this step may be omitted without affecting the remainder of the process of the present invention.

Application of the box average begins by defining a sub-region or "box" 401 of specified size centered on an individual edge point 402. The size of the box dimension, $\Delta\chi$, for example 5 m as shown in FIG. 4, can be user-specified based on the level of noise in the edge data or can be set in other ways, for example, as a function of or the desired resolution of the edge data. Edge points contained within the box of fixed size are averaged to obtain a mean edge data point 403a. Edge points within that box are then eliminated from the edge data set and the box is moved to the next edge point remaining in the data. The physical location of the next edge point does not have a geographical relation to the box average just performed. The purpose of the box average is to smooth the edge data into a linear array of coordinate locations that represent the thick, jagged band of edge coordinate locations that can be a product of the image processing step. The result is a set of mean edge data points 403a, 403b, 403c, etc., hereafter referred to as mean edge data points. This box averaging procedure is efficient since the edge data set decreases and so less searching is required as averaging proceeds. In addition, in many cases such as those where overlying obstructions along the water's edge are present in the imagery, box averaging helps to minimize error due to their presence in the water/land pixel differentiation process.

Figure 5:
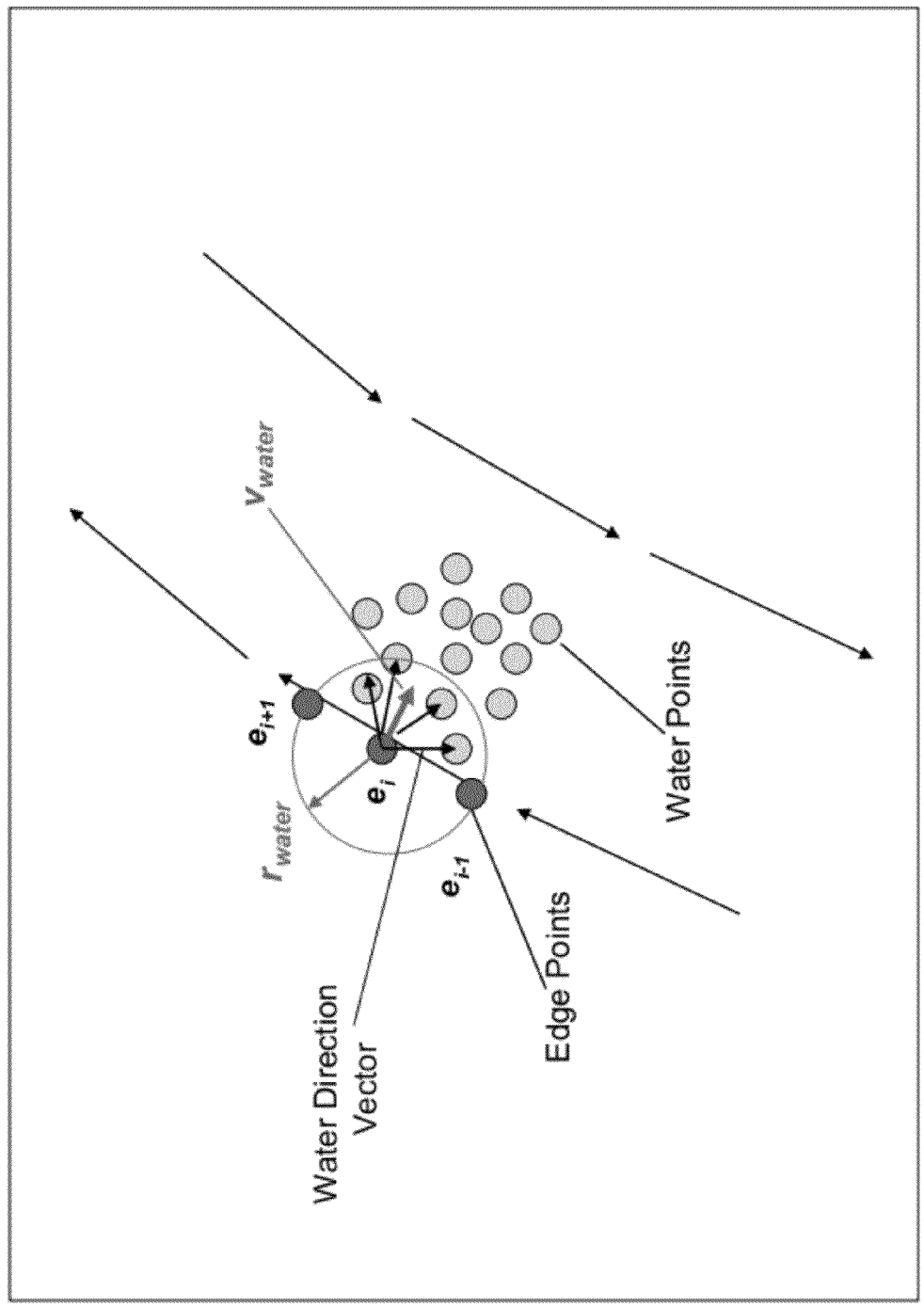
FIG. 5 depicts aspects of boundary segment orientation used in a boundary extraction method in accordance with the present invention.

After all of the edge points are averaged as described above and a set of mean edge points obtained, at step 203 and as illustrated in FIG. 5, for each mean edge point $e_i$, the two nearest neighbor mean edge points $e_{i-1}$ and $e_{i+1}$ within a radius $r_{boundary}$ are identified. In some embodiments the radius $r_{boundary}$ can be user-specified, while in others it can be set as part of another setting such as the desired resolution of the edge or otherwise. The three edge points $e_{i-1}$, $e_i$, and $e_{i+1}$ can then be combined to form a single 3-point boundary segment. The process is repeated for each mean edge point, with the result being a set of 3-point boundary segments produced from the edge data.

At step 204 and as further shown in FIG. 5, in accordance with the present invention, an orientation of the edge points within each 3-point boundary segment can then be determined and a set of oriented edge points can be obtained by a transformation of the water data and the edge data with respect to the clockwise or counterclockwise orientation of the shoreline boundary which was selected during the initialization step. When properly oriented, the boundary segments can be joined to form a continuous loop around the body of water. For example, in the embodiment illustrated in FIG. 5, the boundary segment vectors on the left and right banks of the water are shown as going in opposite directions, as would be consistent with a closed, clockwise oriented loop.

The boundary is ordered based on the location of the water relative to each mean edge data point as identified by a vector that is directed into the water, and so as part of step 204, a mean normalized water direction vector originating at each mean edge point can be created as follows. First, a set of water direction vectors from each mean edge point $e_i$ to all water points (shown as circles in FIG. 5) within a predetermined radius (e.g., $r_{water}$) are created. A mean normalized water direction vector $V_{water}$ at each mean edge point can then be created by taking the average of the water direction vectors originating at that edge point $e_i$. As shown in FIG. 5, the resulting mean normalized water direction vector $V_{water}$ points towards the center of the water and is not skewed towards the banks.

Figure 6D:
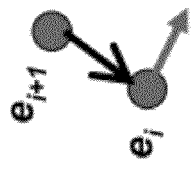
FIGS. 6A-6D depict additional aspects of boundary segment orientation used in a boundary extraction method in accordance with the present invention.
Figure 6C:
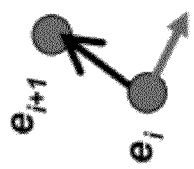
Figure 6B:
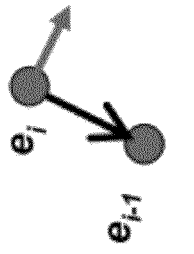
Figure 6A:
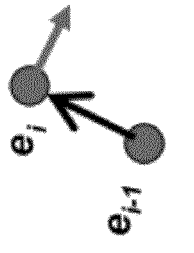

Once the mean normalized water direction vector $V_{water}$ has been determined for one mean edge point $e_i$, its cross product with the edge vectors that extend from that edge point to the two nearest mean edge point neighbors $e_{i-1}$ and $e_{i+1}$ can be determined As shown in FIGS. 6A-6D, each of these edge vectors can have either a head or a tail at $e_i$. Thus, as shown in FIGS. 6A and 6B, the vector between $e_{i-1}$ and $e_i$ can either originate at $e_{1-1}$ and terminate at $e_i$ ("tail vector") or can originate at $e_i$ and terminate at $e_{i-1}$ ("head vector"). The same is true for vectors between $e_i$ and $e_{i+1}$, with the vector being either a head vector as shown in FIG. 6C or a tail vector as shown in FIG. 6D. The cross-product of either one of these edge vectors and the water direction vector $V_{water}$ produces a vector that is orthogonal to the plane of the two vectors used to generate it and is either into or out of this plane. In addition as is readily appreciated, the cross product of $V_{water}$ and a head vector will point in one direction, while the cross product of $V_{water}$ and a tail vector for each edge point will point in opposite directions and thus have opposite signs.

To achieve oriented boundary segments, the sign of the cross-product vectors must be the same. The difference in sign between possible cross-product vectors allows selection of consecutive head and tail vectors that connect edge point $e_i$ with its neighbor edge points $e_{i-1}$ and $e_{i+1}$. From FIG. 6, the tail vector (FIG. 6B) and the head vector (FIG. 6C) would be selected since their cross-products with the mean water point vector would be of the same sign. Upon this selection, the edge points would be consecutively ordered, $e_{1-1}$, $e_i$, and $e_{i+1}$, and processing would continue with the next edge point $e_{i+1}$.

In accordance with the present invention, once all of the cross-product vectors have been calculated and their orientation determined as described above, the head and tail edge points can be assigned for each edge point so that the edge points form an ordered, oriented set capable of being joined in a continuous ordered, properly oriented loop around the body of water. It should be noted that if an edge point is at the edge of the river data domain then it may only have one nearest neighbor, in which case it may be impossible to determine both a head and a tail point for an edge point. Similar circumstances may arise as a result of noisiness in the water data (e.g., water points located outside of the main river channel). Noisy edge data points are not connected to the contiguous shoreline segment being formed but form the start of a new shoreline segment. Thus noisy edge data points may be isolated in this procedure and can be eliminated later by the specification of a minimum number of edge points per segment.

To form a continuous boundary, at step 205 shown in FIG. 2, a set of ordered boundary segments is created from the set of ordered edge points. First, a head-tail triplet of edge points $e_{i-1}$, $e_i$ and $e_{i+1}$ can be linked to form a boundary segment having a specific head point and a specific tail point. This step is repeated for each edge point $e_i$ and in this manner, a boundary segment can grow until an edge point is reached that does not have a head point (or a tail point). Once this occurs, a new segment is started and so on until all of the edge points are sampled. In some cases, this process will also generate closed loop outside the main river channel, e.g., closed loops defining ponds, lakes, etc. that can be eliminated later as not being relevant to the shoreline of interest.

Segments with 3 or more points that have head and tail points within $r_{boundary}$, the previously specified search distance for nearest neighbors, can be closed. The remaining open segments can then be linked together by determining which segment start point is within $r_{boundary}$ of a segment end point. This process also can generate a number of closed segments that can be eliminated later.

As the segments are linked, they can form one or more longer segments. These large multi-point segments in turn can then be linked together to create the shorelines for rivers or coastal areas. Because larger segments are also ordered it is straightforward to determine which neighboring segments are to be linked since head to tail point ordering must be maintained.

The final step is to specify a threshold for the minimum number of points necessary to be contained within closed loop in order for that segment to be retained. A closed loop comprising a number of edge points less than this cutoff threshold can be automatically eliminated, thus automatically eliminating extraneous water data and noisy edge data. Thus, small closed regions containing water data can be easily eliminated since they correspond primarily to noise from the image processing.

Figure 7A:
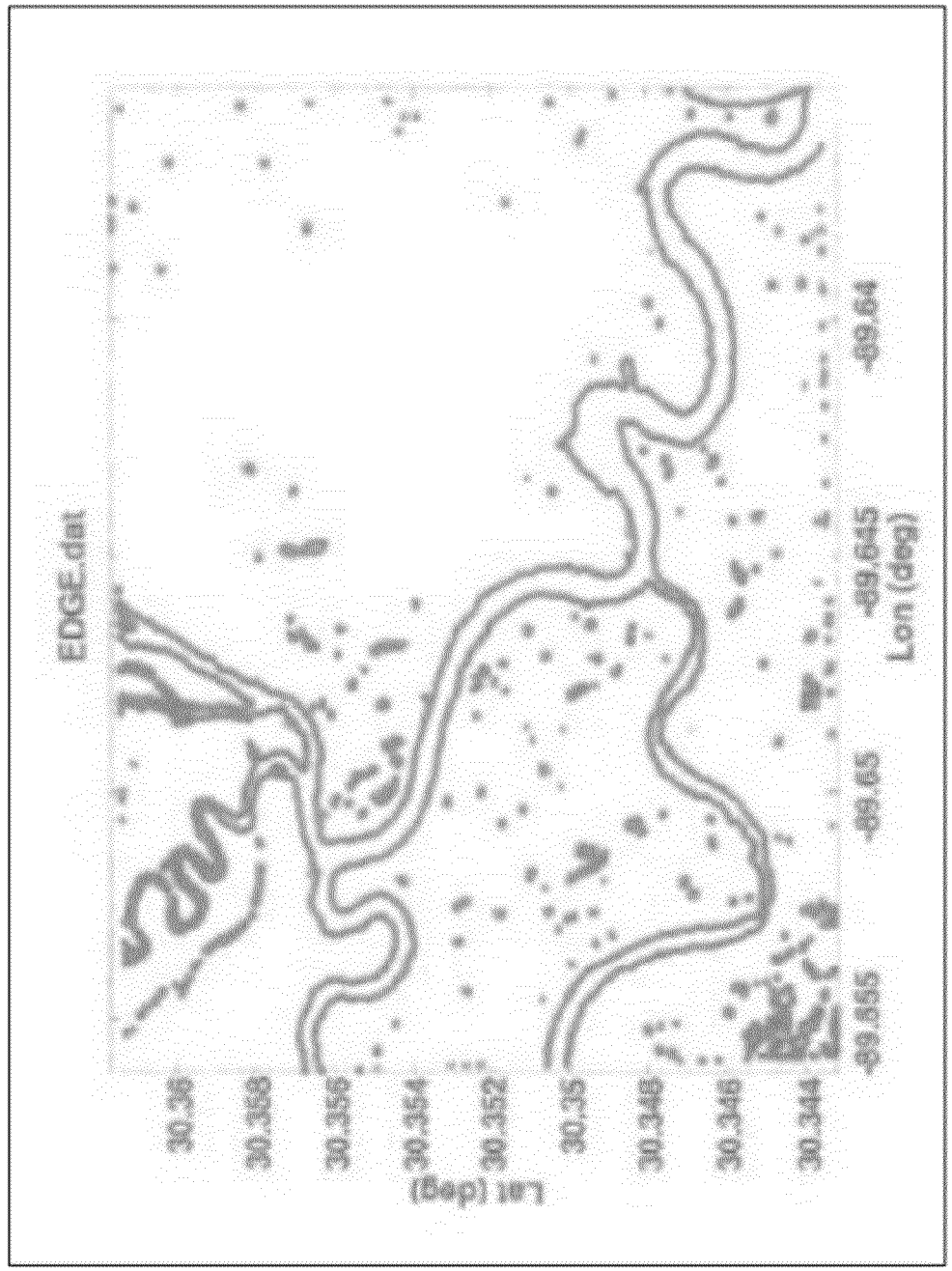
FIGS. 7A and 7B depict imagery of the Pearl River in Mississippi generated from pixilated edge data (FIG. 7A) and ordered boundary data obtained in accordance with the present invention (FIG. 7B).
Figure 7B:
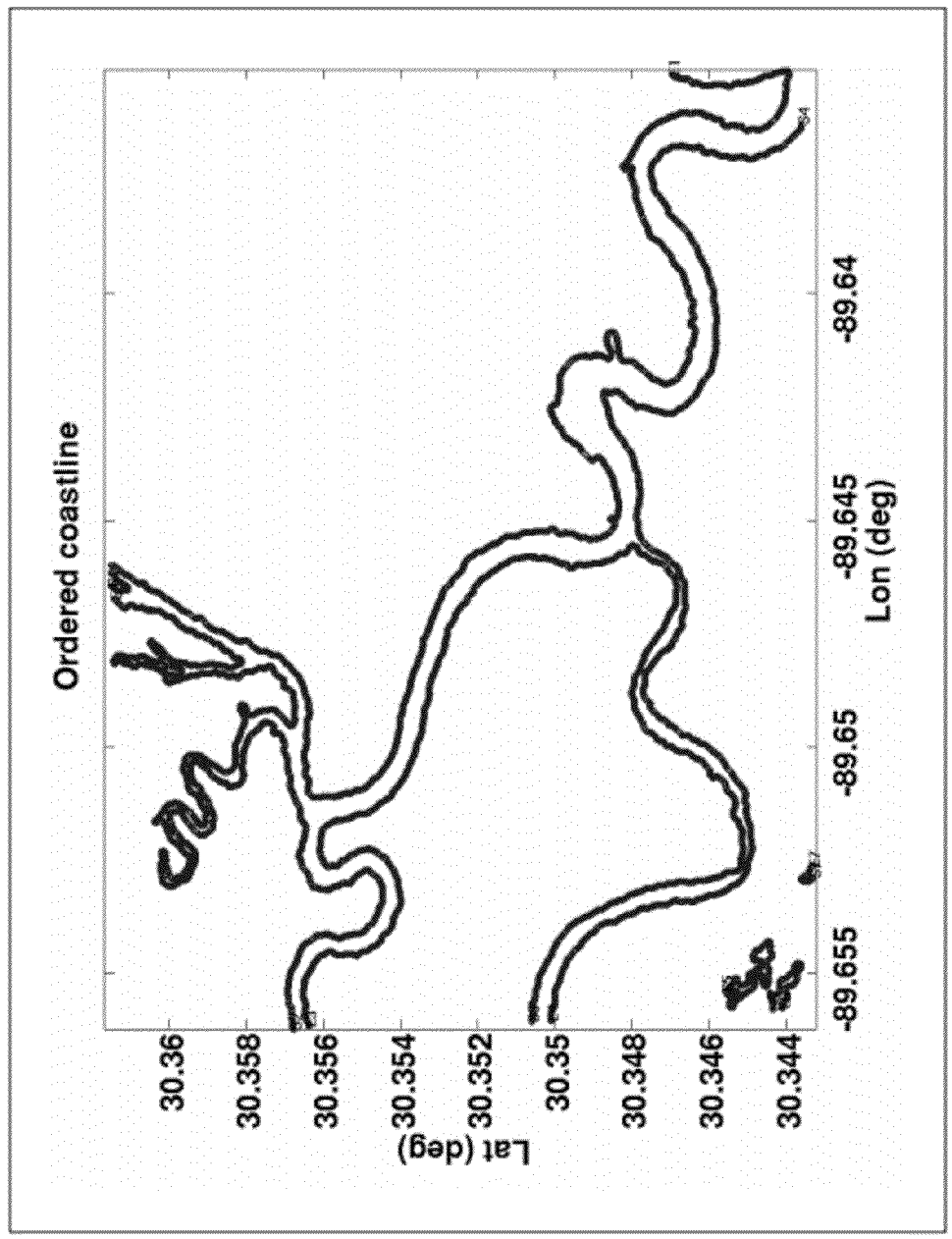
Figure 8:
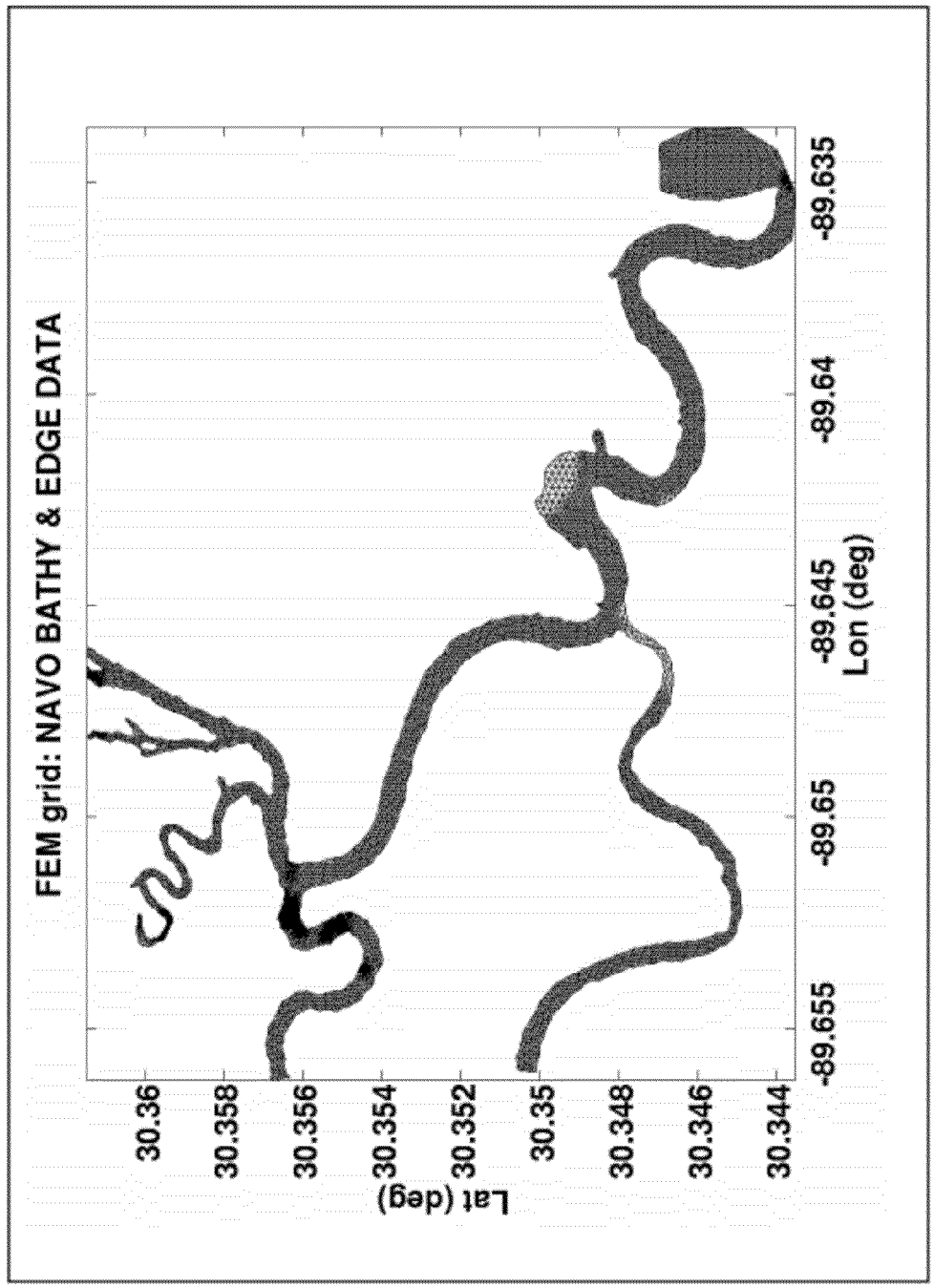
FIG. 8 depicts a finite element mesh of a portion of the Pearl River, Miss. created using boundary data derived in accordance with the present invention.

Thus, in accordance with the present invention, a set of discretized edge point data such as that reflected in the image shown in FIG. 7A can be automatically transformed into ordered shoreline data which can be used to generate relatively clean, noise-free shoreline imagery such as that shown in FIG. 7B. Such ordered shoreline data can easily be imported into many different applications such as ADCIRC mesh generation software. An exemplary image of a finite element mesh of a portion of the Pearl River generated from ordered shoreline data obtained in accordance with the present invention is shown in FIG. 8.

The method described herein can thus obtain ordered shoreline information from remotely sensed imagery in riverine environments in a robust, efficient automated manner, by using readily available data sets from remotely sensed imagery and without resorting to complex mathematical methods.

One reason the method of the present invention is so effective is that it relates the edge point data to the water data. Although it can be somewhat of an art to determine the land-water edge locations from imagery, there are an abundance of pixel data indicating the presence of water. The use of a mean normalized water vector to orient the boundary segments derived from edge data results in a direction that is rather insensitive to noise in the water data. The cross product between the mean water vector and the boundary segments neighboring a particular edge point provides an unequivocal indicator of the neighboring head and tail edge points for any particular edge point. Thus there is no need to constrain how the shoreline changes direction from edge point to edge point. Furthermore, this approach for connecting edge points does not smooth the boundary segments. The only modification of the edge data takes place during the initial smoothing of the edge points within a moving box region of a user specified size. The pre-specified box (e.g. 3 m by 3 m) could be any size, so there is no inherent reason that the edge point resolution must be reduced. Smoothing in this application was employed with the end river model application in mind.

In addition, the method of the present invention is robust, efficient, and easy to apply to a wide range of remotely sensed data. The source of the imagery is not limited as long as both edge and water data locations can be obtained. In fact, the methodology is not limited the use of data derived from imagery. Any source of data that represent both shoreline and water locations can be used, such as unprocessed shoreline data from standard databases (e.g. NOAA World Vector Shoreline database and available bathymetry data).

As will be appreciated by one of ordinary skill in the art, one or more aspects of a method for automatically extracting and generating an ordered shoreline data set as described herein can be accomplished by one or more processors executing one or more sequences of one or more computer-readable instructions read into a memory of one or more computers from volatile or non-volatile computer-readable media capable of storing and/or transferring computer programs or computer-readable instructions for execution by one or more computers. Appropriate volatile media can include a memory such as a dynamic memory in a computer. Appropriate non-volatile media can include a compact disk, hard disk, floppy disk, tape, magneto-optical disk, PROM (EPROM, EEPROM, flash EPROM), SRAM, SDRAM, or any other magnetic medium; punch card, paper tape, or any other physical medium such as a chemical or biological medium. The present invention contemplates use of any and all such media and combinations thereof.

Although particular embodiments, aspects, and features have been described and illustrated, it should be noted that the invention described herein is not limited to only those embodiments, aspects, and features. It should be readily appreciated that modifications may be made by persons skilled in the art, and the present application contemplates any and all modifications within the spirit and scope of the underlying invention described and claimed herein. For example, the method described herein can be implemented within a series of MATLAB routines that provide for interactive specification of the various parameters described herein as well as enabling visualization of the results. However, as can be appreciated by those skilled in the art, a method for automatically transforming water and edge data into ordered shoreline data as described herein is not limited to MATLAB implementation but can be accomplished using any appropriate hardware or software configured to execute instructions in accordance with the description herein. In addition, the shoreline extraction method described herein is not specific to a particular source of imagery or the means by which the water and edge data are obtained.

In addition, although the present invention is described herein in the context of shorelines and extraction of shoreline boundaries, one skilled in the art would readily appreciate that the methodology of the present invention can be equally applicable for use in extracting many other kinds of boundaries from digital imagery, including natural boundaries such as those delineating a canyon or other geological formations and manmade boundaries such as those delineating a roadway. In such cases pixels indicative of the presence of one type of feature, e.g., a deep depression in the land in the case of a canyon, and of an interface between that feature and the surrounding area can take the place of "water pixels" and "edge pixels" as described herein.

All of these and other alternative embodiments are contemplated to be within the scope and spirit of the present disclosure.

What is claimed is:

1. A computer-implemented method for extracting an ordered shoreline from a digital image, comprising:
    receiving a set of water data comprising a plurality of pixel locations indicative of a presence of water in the image;
    receiving a set of edge data comprising a plurality of pixel locations indicative of a land-water interface in the image;
    transforming the edge data into a set of mean edge data points $e_i$;
    transforming the mean edge data points into a plurality of 3-point boundary segments, each 3-point boundary segment comprising a mean edge data point $e_i$ and its two nearest neighbor mean edge points $e_{i-1}$ and $e_{i+1}$;
    determining a mean normalized water direction vector originating at each mean edge data point $e_i$, the mean normalized water direction vector pointing from $e_i$ towards the center of the water;
    taking a first cross-product of the mean normalized water direction vector with each of a head vector and a tail vector extending between $e_i$ and $e_{i-1}$ and taking a second cross product of the mean normalized feature direction vector with each of a head vector and a tail vector extending between $e_i$ and $e_{i+1}$;
    assigning one of a head and a tail to $e_i$ based on the results of the first and second cross-products and a predetermined one of a clockwise and a counterclockwise direction of the shoreline;
    transforming the data of each mean edge data point $e_i$, its associated one of a head and a tail and its nearest neighbors $e_{i-1}$ and $e_{i+1}$ into a set of ordered shoreline boundary segments; and
    joining the set of ordered shoreline boundary segments to form the shoreline.

2. The method according to claim 1, wherein said step of transforming the edge data into the set of mean edge data $e_i$ comprises the step of:
    applying a box average to edge data points within a box of predetermined size centered around a first selected edge data point;
    obtaining a mean edge point coordinate location for edge data points within the box;
    saving the mean edge data point to memory;
    discarding the edge data points within the box; and
    applying the box average to edge data points within the box centered around a second selected edge data point.

3. The method according to claim 2, wherein a size of the box is user-specified.

4. The method according to claim 2, wherein a size of the box is determined by a selected resolution of the boundary segments.

5. The method according to claim 1, wherein the predetermined direction is user-specified.

6. The method according to claim 1, wherein the predetermined direction is determined by another application in which the boundary data is to be used.

7. The method according to claim 1, wherein the set of ordered boundary segments is ordered based on the assignment of the heads and tails and the predetermined direction of the boundary.

8. A computer program product wherein a computer program code mechanism embedded in a non-transitory computer storage medium for extracting an ordered shoreline from a digital image, comprising:
    a computer code module configured to receive a set of water data comprising a plurality of pixel locations indicative of a presence of water in the image;
    a computer code module configured to receive a set of edge data comprising a plurality of pixel locations indicative of a land-water interface in the image;
    a computer code module configured to transform the edge data into a set of mean edge data points $e_i$;
    a computer code module configured to transform the mean edge data points into a plurality of 3-point boundary segments, each 3-point boundary segment comprising a mean edge data point $e_i$ and its two nearest neighbor mean edge points $e_{i-1}$ and $e_{i+1}$;
    a computer code module configured to determine a mean normalized water direction vector originating at each mean edge data point $e_i$, the mean normalized water direction vector pointing from $e_i$ towards the center of the water;
    a computer code module configured to take a first cross-product of the mean normalized water direction vector with each of a head vector and a tail vector extending between $e_i$ and $e_{i-1}$ and to take a second cross product of the mean normalized feature direction vector with each of a head vector and a tail vector extending between $e_i$ and $e_{i+1}$;
    a computer code module configured to assign one of a head and a tail to $e_i$ based on the results of the first and second cross-products and a predetermined one of a clockwise and a counterclockwise direction of the shoreline;
    a computer code module configured to transform the data of each mean edge data point $e_i$, its associated one of a head and a tail and its nearest neighbors $e_{i-1}$ and $e_{i+1}$ into a set of ordered shoreline boundary segments; and
    a computer code module configured to join the set of ordered shoreline boundary segments to form the shoreline.

* * * * *